E. J. RICH.
THREAD MEASURING MACHINE.
APPLICATION FILED JAN. 25, 1909.

947,580.

Patented Jan. 25, 1910.

3 SHEETS—SHEET 1.

Witnesses:

Inventor:
E. J. Rich

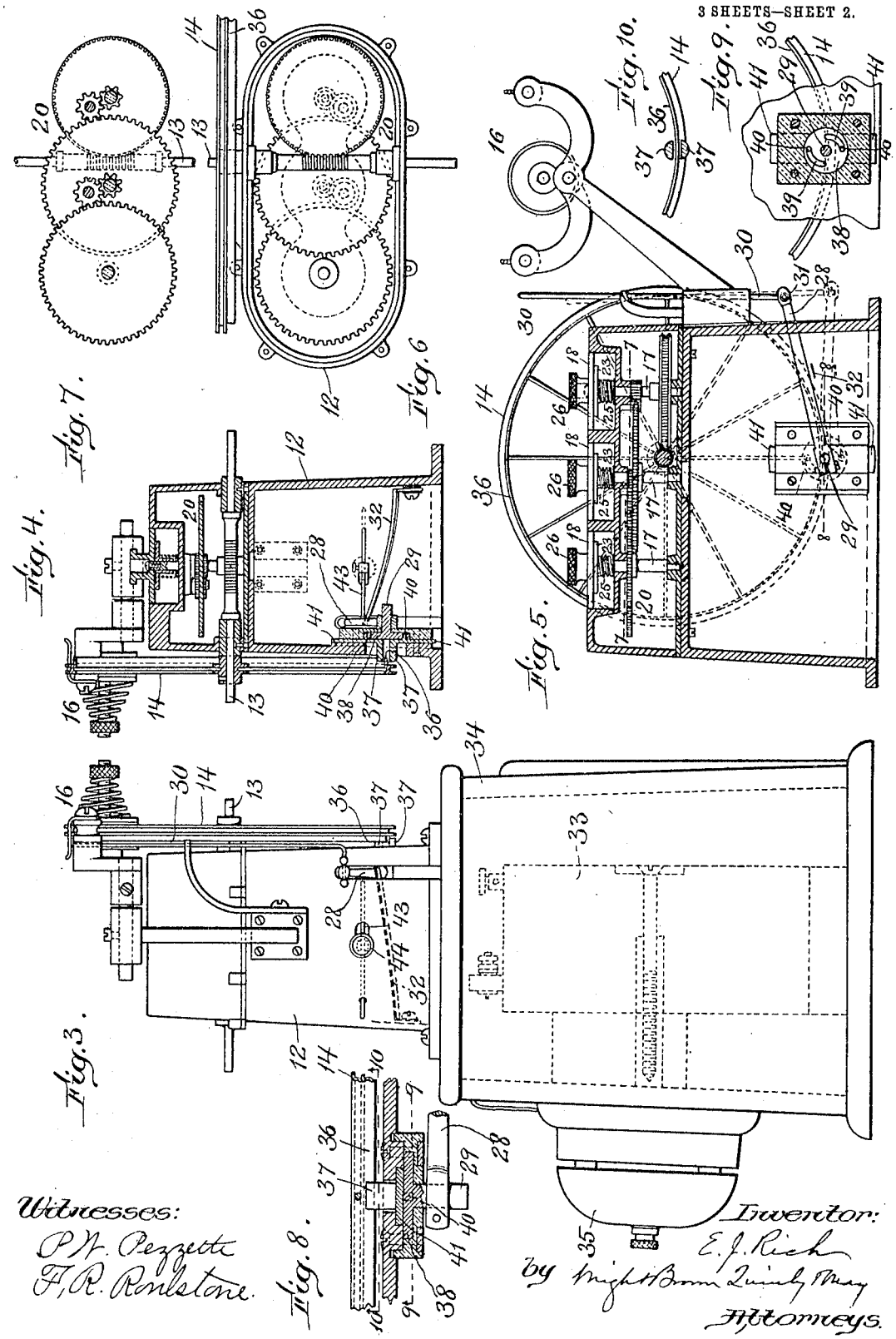

E. J. RICH.
THREAD MEASURING MACHINE.
APPLICATION FILED JAN. 25, 1909.
947,580.
Patented Jan. 25, 1910.
3 SHEETS—SHEET 3.
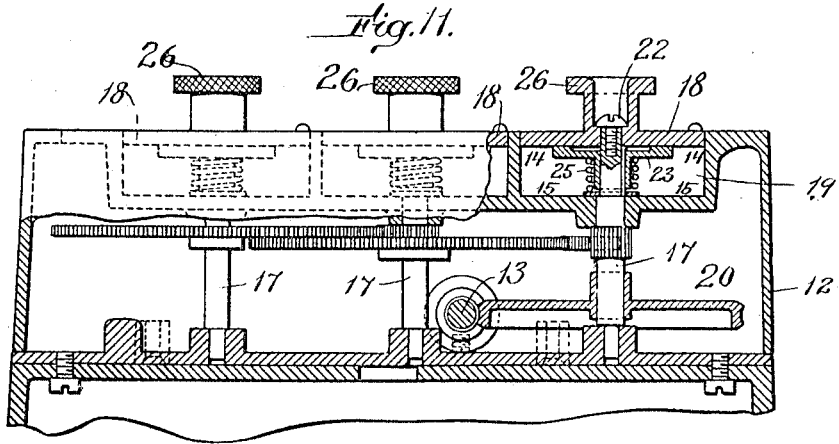
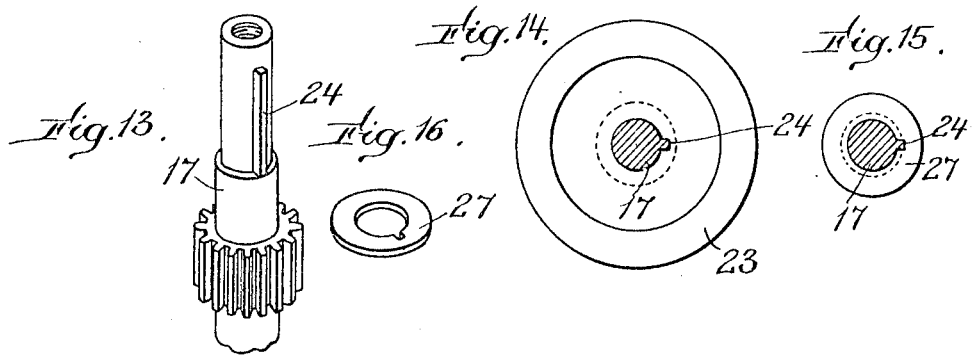
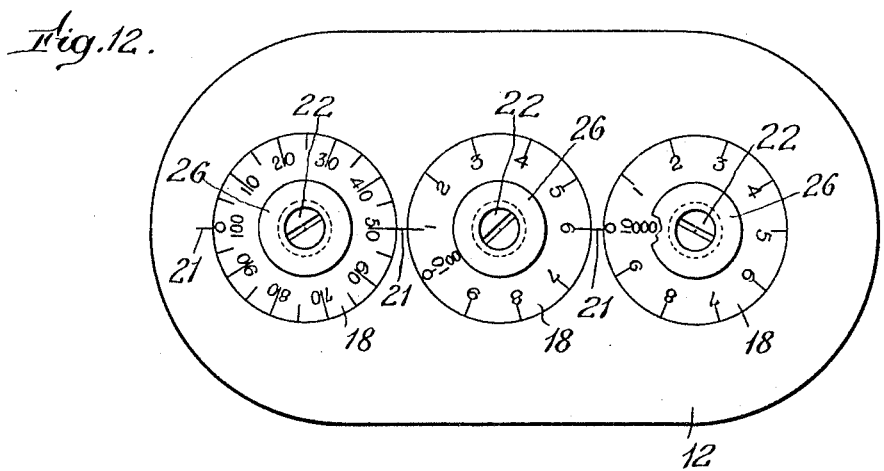
Witnesses:
O. W. Pezzetti
A. R. Roulstone
Inventor:
E. J. Rich
by Wright Brown Quinby May
Attorneys.

UNITED STATES PATENT OFFICE.

EVELYN J. RICH, OF EAST HAMPTON, CONNECTICUT, ASSIGNOR TO SUMMIT THREAD COMPANY, OF EAST HAMPTON, CONNECTICUT, A CORPORATION OF MAINE.

THREAD-MEASURING MACHINE.

947,580.   Specification of Letters Patent.   Patented Jan. 25, 1910.

Application filed January 25, 1909. Serial No. 473,985.

*To all whom it may concern:*

Be it known that I, EVELYN J. RICH, of East Hampton, in the county of Middlesex and State of Connecticut, have invented certain new and useful Improvements in Thread-Measuring Machines, of which the following is a specification.

This invention relates to machines for measuring thread while it is being wound upon spools, etc., and it has for its object to provide an efficient and accurate thread measuring machine adapted to register the quantity of thread measured, and provided with an emergency member which, in case of breakage of the thread, actuates an alarm which calls attention to the breakage, and a brake which arrests the movement of the registering mechanism so that it will not be impelled by the momentum of the measuring wheel which is rotated by the passage of the thread over it.

The invention also has for its object to provide an improved construction of registering mechanism in a machine of this character, the indicating or registering members of which are frictionally connected with their drivers so that they may be conveniently set back to zero, or the starting point, at any time.

The invention consists in the improvements which I will now proceed to describe and claim.

Figure 1:
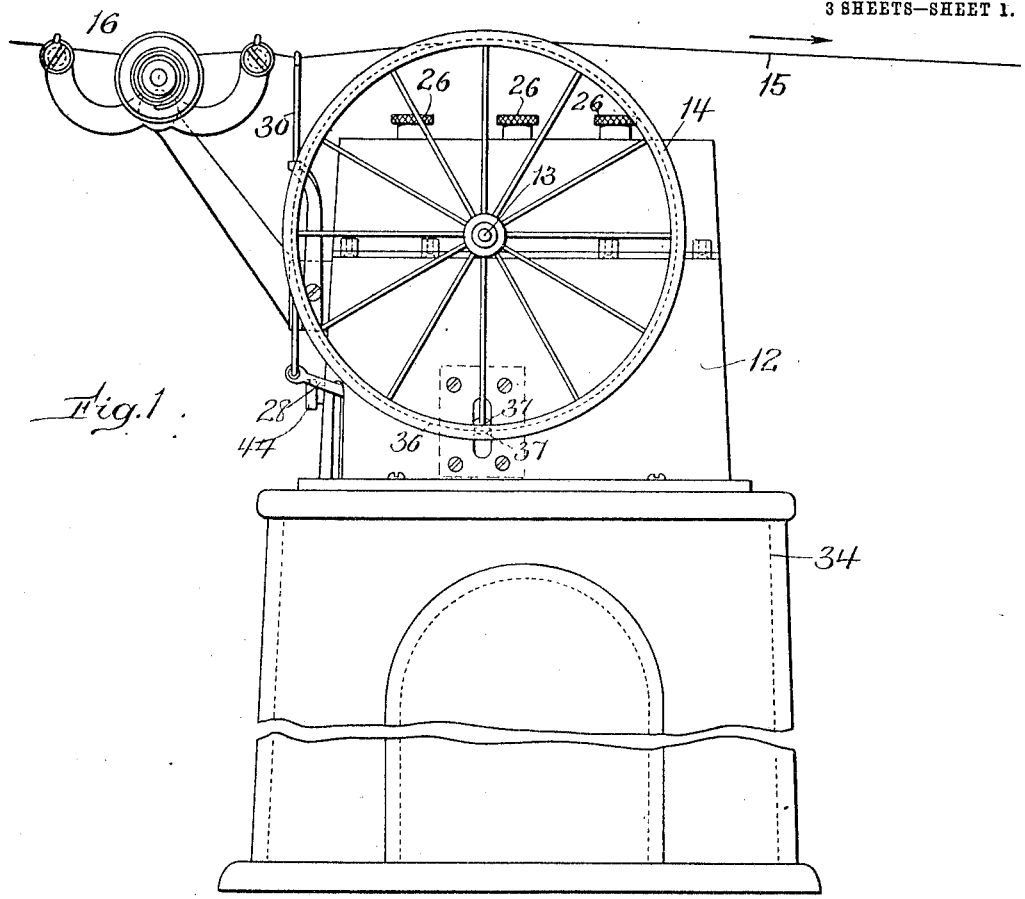
Figure 2:
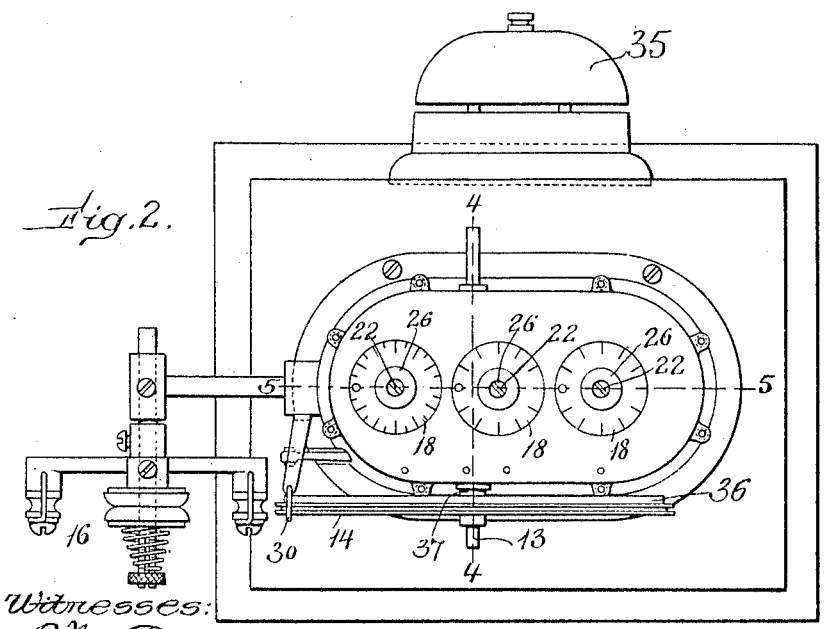

Of the accompanying drawings, forming a part of this specification,—Figure 1 represents a side elevation of a thread measuring machine embodying my invention. Fig. 2 represents a top plan view of the same. Fig. 3 represents an end elevation. Fig. 4 represents a section on line 4—4 of Fig. 2.
Fig. 5 represents a section on line 5—5 of Fig. 2. Fig. 6 represents an inverted plan view of the portion of the machine which includes the registering mechanism. Fig. 7 represents a section on line 7—7 of Fig. 5, and a plan view of the parts below said line. Fig. 8 represents a section on line 8—8 of Fig. 5. Fig. 9 represents a section on line 9—9 of Fig. 8. Fig. 10 represents a section on line 10—10 of Fig. 8. Fig. 11 represents a side elevation, partly in section, of the portion of the machine which includes the registering mechanism. Fig. 12 represents a plan view of the portion shown in Fig. 11. Fig. 13 represents a perspective view of the por-
tion of one of the indicator operating shafts.
Fig. 14 represents a section on line 14—14 of Fig. 11. Fig. 15 represents a section on line 15—15 of Fig. 11. Fig. 16 represents a perspective view of the washer shown in Figs. 11 and 15.

The same reference characters indicate the same parts in all the figures.

In the drawings, 12 represents a casing having bearings in which is journaled a shaft 13, which operates the registering mechanism, hereinafter described.

14 represents a measuring wheel having flanges at opposite sides of its periphery to confine on the latter one or more wraps of the thread 15 to be measured.

16 represents a tension device of any suitable character located adjacent to the thread-receiving side of the wheel, namely, the side toward which the thread moves in its passage from a source of supply to an accumulating spool, not shown, the movement of the thread being in the direction indicated by the arrow in Fig. 1, and causing the rotation of the measuring wheel and the shaft 13. The tension device 16 may be of any suitable character adapted to hold the thread approaching the winding wheel under sufficient tension, and cause it to closely hug the periphery of the wheel.

The registering mechanism includes a plurality of shafts 17 journaled in bearings in the casing 12, and indicators 18 mounted on said shafts and adapted to be rotated thereby, the indicators being preferably disks, the upper surfaces of which are graduated, as shown in Fig. 12, three disks being here shown, one indicating tens, another hundreds, and the third thousands. The indicators 18 are preferably located in recesses 19 formed in the top of the casing 12, the graduated upper sides of the indicators being substantially flush with the portions of the top of the casing which surround the recesses 19.

The operating shaft 13 is geared to the shaft of the tens indicator, the last mentioned shaft being geared to the shaft of the hundreds indicator, which, in turn, is geared to the shaft of the thousands indicator. The train of gearing 20 is indicated in plan in Figs. 6 and 7, and requires no detailed description further than the statement that its members are so proportioned that one rotation of the first shaft of the series causes a tenth of a complete rotation of the second shaft, while one rotation of the second shaft causes a tenth of a rotation of the third shaft. The top of the casing 12 is provided with indicating marks 21, as shown in Fig. 12, said marks registering with the graduations on the indicators 18, and showing when each indicator has made a complete rotation.

Each indicator 18 is rotatable independently of its shaft 17, and is frictionally engaged therewith, so that the indicator may be at any time turned by hand independently upon its shaft to reset it. The preferred construction whereby the indicators are frictionally engaged with their shafts is shown in Figs. 1, 13, 14, 15, and 16. The shaft 17 is provided at its upper end with a detachable member 22 which is preferably the head of a screw engaged with a tapped socket formed in the shaft, said head being of greater diameter than the shaft and adapted to bear on the upper side of the indicator.

23 represents a spring-pressed disk which is mounted to slide on the shaft 17, and is rotatively engaged therewith by a key 24 on the shaft engaging a groove in the hub of the disk. Said disk is pressed by the spring 25 against the under side of the indicator 18, and holds the upper side of the indicator against the head 22, thus establishing a frictional connection between the shaft and the indicator.

26 represents a handle formed on the indicator to enable the operator to conveniently turn the latter for the purpose of resetting it.

The disk 23 and spring 25 are contained in the recess 19, so that they are concealed by the indicator 18 which fills the mouth of the recess.

27 represents a washer which is grooved to engage the key 24 on the shaft 17, and therefore turns with the shaft, said washer supporting the inner end of the spring 25.

An emergency member is provided which is normally held in a retracted or inoperative position by the thread between the tension device and the winding wheel when the thread is passing normally. Said emergency member is automatically movable or projectable from its retracted position when the thread breaks, and when projected it actuates an alarm, and a brake which stops the rotation of the measuring wheel. The said emergency device, as here shown, comprises an arm 28 affixed at one end to a small rock shaft 29 journaled in a bearing on the frame of the machine, and a rod 30 pivoted at 31 to the outer end of the arm 28, said rod having at its upper end a hook adapted to engage the thread at a point between the tension device 16 and the measuring wheel 14, as indicated in Fig. 1. When the thread is running normally, the rod 30 and arm 28 are held in a raised position, shown by full lines in Fig. 5, the emergency member formed by said arm and rod being inoperative when in this position.

32 represents a contact spring which is included in an electric circuit, the battery 33 of which is shown by dotted lines in Fig. 3, said battery being contained in a chambered base 34 on which the casing 12 is supported. An electric alarm bell 35, preferably supported by the base 34, is included in the circuit. The contact spring 32 is located in the path of the arm 28, so that when the latter is projected from the full line position to the dotted line position shown in Fig. 5, it will make contact with the spring 32. Suitable electrical connections are provided which cause the actuation of the bell 35 by contact between the arm 28 and the contact spring 32. This contact occurs only when the thread breaks between the tension device and the measuring wheel, the attention of the attendant being therefore immediately called to the breakage of the thread.

The measuring wheel is provided with a laterally projecting annular flange 36, the sides of which form brake shoe engaging faces.

37, 37 represent brake shoes which are movable simultaneously in opposite directions in suitable guides on the frame of the machine, and are so connected with the arm 28 that when the latter is retracted, the brake shoes are held out of contact with the flange 36, and when said arm is projected, as shown by dotted lines in Fig. 5, the brake shoes are pressed simultaneously against the flange 36, and immediately arrest the rotation of the measuring wheel, so that the continued rotation of the latter by its own momentum, after the breakage of the thread, is prevented.

The preferred connection between the arm 28 and the brake shoes 37 include a disk 38 affixed to the rock shaft 29, and having cam slots 39 which receive studs 40 affixed to shanks or guides 41 on which the brake shoes are mounted. When the arm 28 is retracted, the studs 40 occupy the outer end portions of the cam slots 39, as shown in Fig. 9. When the arm 28 is projected, the partial rotation of the disk 38 caused thereby moves the brake shoes simultaneously against the opposite sides of the flange 36, thus immediately arresting the rotation of the measuring wheel.

My invention is not limited to the details of mechanism here shown, as the same may be variously modified without departing from the spirit of the invention.

When the machine is not in operation, the arm 28 may be supported in its retracted position by means of a detent 43 which is movable in a guide in the casing, and is adapted to be moved at one end under the arm 28 to prevent the projection of the latter. The detent 43 has a handle 44 whereby it may be operated.

I claim:

1. In a thread measuring machine, in combination, a measuring wheel having a brake-engaging face, registering mechanism operated by the rotation of the wheel, a tension device at the receiving side of the wheel, an emergency member normally held in a retracted position by the thread between the tension device and the measuring wheel, and automatically projected upon the breakage of the thread, a brake device adapted to engage the wheel face, and means for positively connecting the brake device and the emergency member whereby the brake device is caused to stop the wheel by the projection of said member.

2. In a thread-measuring machine, in combination, a measuring wheel having a brake-engaging face, registering mechanism operated by the rotation of the wheel, a tension device at the receiving side of the wheel, an emergency member normally held in a retracted position by the thread between the tension device and the measuring wheel, and automatically projected upon the breakage of the thread, a brake device adapted to engage the wheel face, means for positively connecting the brake device and the emergency member whereby the brake device is caused to stop the wheel by the projection of said member, an alarm, and means operated by the automatic movement of the emergency member for actuating the alarm.

3. In a thread measuring machine, in combination, a measuring wheel having an annular lateral flange presenting an external and an internal brake-engaging face, registering mechanism operated by the rotation of the wheel, a tension device at the receiving side of the wheel, an emergency member normally held in a retracted position by the thread between the tension device and wheel, and automatically projected upon the breakage of the thread, a pair of brake shoes located at opposite sides of the wheel flange, and connections between said shoes and the emergency member, whereby the brake shoes are simultaneously engaged with the flange by the projection of the emergency member.

4. In a thread measuring machine, in combination, a measuring wheel having an annular lateral flange presenting an external and an internal brake-engaging face, registering mechanism operated by the rotation of the wheel, a tension device at the receiving side of the wheel, an emergency member including an oscillatory arm adapted to be supported in a retracted position by the thread between the tension device and wheel, and automatically projected when the thread breaks, a pair of brake shoes located at opposite sides of said flange, and connections between said shoes and the oscillatory arm whereby the shoes are simultaneously engaged with the flange by the projection of the arm.

5. In a thread measuring machine, in combination, a measuring wheel having an annular lateral flange presenting an external and an internal brake-engaging face, registering mechanism operated by the rotation of the wheel, a tension device at the receiving side of the wheel, an emergency member including an oscillatory arm adapted to be supported in a retracted position by the thread between the tension device and wheel, and automatically projected when the thread breaks, and a pair of brake shoes located at opposite sides of said flange and provided with studs, and a disk affixed to the said arm and having cam slots engaging the studs on the brake shoes.

In testimony whereof I have affixed my signature, in presence of two witnesses.

EVELYN J. RICH.

Witnesses:
 GEO. A. HOREY,
 FRED. H. BARTON.